(12) United States Patent
Aitharaju et al.

(10) Patent No.: US 9,592,853 B2
(45) Date of Patent: Mar. 14, 2017

(54) CORRUGATION DESIGNS

(71) Applicants: GM Global Technology Operations LLC, Detroit, MI (US); Teijin Limited, Osaka (JP)

(72) Inventors: Venkat Aitharaju, Troy, MI (US); Yutaka Yagi, Shelby Township, MI (US); Yuhei Konagai, West Bloomfield, MI (US)

(73) Assignees: GM Global Technology Operations LLC, Detroit, MI (US); Teijin Limited, Osaka (JP)

( * ) Notice: Subject to any disclaimer, the term of this patent is extended or adjusted under 35 U.S.C. 154(b) by 0 days.

(21) Appl. No.: 14/321,907

(22) Filed: Jul. 2, 2014

(65) Prior Publication Data
US 2016/0001816 A1    Jan. 7, 2016

(51) Int. Cl.
| | |
|---|---|
| *B62D 21/15* | (2006.01) |
| *B62D 29/04* | (2006.01) |
| *B62D 25/20* | (2006.01) |

(52) U.S. Cl.
CPC ............. *B62D 21/15* (2013.01); *B62D 29/04* (2013.01); *B62D 25/2054* (2013.01)

(58) Field of Classification Search
CPC ............ B62D 25/2054; B62D 25/2072; B62D 25/2027; B62D 33/02; B62D 21/15; B62D 29/04; B60R 2021/0004; B60R 2021/0009
USPC ... 296/182.1, 181.3, 183.1, 184.1, 39.2, 191
See application file for complete search history.

(56) References Cited

U.S. PATENT DOCUMENTS

| | | | |
|---|---|---|---|
| 3,188,131 | A | 6/1965 | Spencer |
| 3,310,925 | A | 3/1967 | Le Brun |
| 3,331,433 | A | 7/1967 | Hagberg |
| 3,481,643 | A | 12/1969 | Campbell |
| 3,868,796 | A | 3/1975 | Bush |
| 4,109,503 | A | 8/1978 | Francon et al. |
| 4,128,271 | A | 12/1978 | Gray |

(Continued)

FOREIGN PATENT DOCUMENTS

| | | |
|---|---|---|
| CN | 105292266 A | 2/2016 |
| CN | 105292267 A | 2/2016 |

(Continued)

OTHER PUBLICATIONS

U.S. Appl. No. 14/321,902, filed Jul. 2, 2014.

(Continued)

*Primary Examiner* — Gregory Blankenship
(74) *Attorney, Agent, or Firm* — Harness, Dickey & Pierce, P.L.C.

(57) ABSTRACT

Provided is a load-carrying or non-load carrying structural component for a vehicle having improved impact resistance, such as a gas tank protection shield, an underbody shield, a structural panel, an interior floor, a floor pan, a roof, an exterior surface, a storage area, a glove box, a console box, a trunk, a trunk floor, a truck bed, and combinations thereof. The component has a support structure with ridges, each spaced apart from one another at predetermined intervals, to form a corrugated surface capable of load-carrying. The ridges are longitudinally extending, raised ridges and define top and side walls. A plurality of strategically thickened areas is on at least one of the top wall and side walls.

16 Claims, 5 Drawing Sheets

(56) References Cited

U.S. PATENT DOCUMENTS

| | | | |
|---|---|---|---|
| 4,241,146 A * | 12/1980 | Sivachenko | B21B 1/095 428/124 |
| 4,288,957 A * | 9/1981 | Meehan | E04B 5/10 105/422 |
| 4,341,412 A * | 7/1982 | Wayne | B60R 13/01 296/39.2 |
| 4,545,172 A | 10/1985 | Wardill | |
| 4,726,159 A | 2/1988 | Stohs | |
| 4,770,018 A * | 9/1988 | Bosl | B21D 5/08 72/177 |
| 4,862,666 A | 9/1989 | Kero | |
| 4,867,203 A | 9/1989 | Putter | |
| 5,170,605 A * | 12/1992 | Huddle | B60P 3/20 52/588.1 |
| 5,188,418 A | 2/1993 | Walworth, Jr. et al. | |
| 5,421,634 A * | 6/1995 | Hackett | B60R 13/01 296/183.1 |
| 5,440,998 A | 8/1995 | Morgan, IV et al. | |
| 5,457,921 A | 10/1995 | Kostrzecha | |
| 5,501,055 A | 3/1996 | Storch et al. | |
| 5,579,615 A | 12/1996 | Hoffman | |
| 5,722,711 A | 3/1998 | German | |
| 5,730,486 A * | 3/1998 | Jurica | B62D 25/2054 296/184.1 |
| 5,791,118 A | 8/1998 | Jordan | |
| 5,899,519 A * | 5/1999 | Doshi | B60R 13/01 296/183.1 |
| 5,927,788 A | 7/1999 | Long | |
| 5,938,272 A | 8/1999 | Jurica et al. | |
| 6,015,178 A | 1/2000 | Haack | |
| 6,079,168 A | 6/2000 | Shaver | |
| 6,082,810 A * | 7/2000 | Bennett | B62D 25/2054 296/184.1 |
| 6,128,815 A * | 10/2000 | Jurica | B62D 25/2054 29/417 |
| 6,170,897 B1 | 1/2001 | Karrer | |
| 6,347,454 B1 * | 2/2002 | Jurica | B62D 25/2054 29/417 |
| 6,439,647 B1 * | 8/2002 | Baldwin | B60J 7/1657 296/164 |
| 6,439,649 B1 | 8/2002 | Lorenzo et al. | |
| 6,644,721 B1 * | 11/2003 | Miskech | B62D 25/2054 296/183.1 |
| 6,702,532 B1 | 3/2004 | Throener | |
| 7,152,911 B1 * | 12/2006 | McNulty | B62D 25/2054 296/184.1 |
| 7,290,827 B2 | 11/2007 | McNulty et al. | |
| 7,416,236 B2 | 8/2008 | Boddie et al. | |
| 7,687,183 B2 | 3/2010 | Lai | |
| 7,731,271 B2 | 6/2010 | Shelbo et al. | |
| 7,819,462 B1 | 10/2010 | Owens | |
| 7,823,958 B2 * | 11/2010 | Sato | B62D 21/03 296/183.1 |
| 7,926,866 B2 * | 4/2011 | Schmidt | B62D 33/046 296/181.1 |
| 8,033,592 B2 | 10/2011 | Hsu et al. | |
| 8,109,060 B1 | 2/2012 | Motosko | |
| 8,123,283 B2 | 2/2012 | Edwards et al. | |
| 8,276,967 B1 | 10/2012 | Ming-Shun | |
| 2001/0031185 | 10/2001 | Swensen | |
| 2001/0046588 A1 | 11/2001 | Sturtevant et al. | |
| 2002/0149223 A1 | 10/2002 | Saucier et al. | |
| 2002/0159873 A1 | 10/2002 | Amos et al. | |
| 2003/0047964 A1 * | 3/2003 | Jurica | B21D 13/00 296/184.1 |
| 2005/0140177 A1 | 6/2005 | Montagna et al. | |
| 2005/0142333 A1 | 6/2005 | Montagna et al. | |
| 2005/0152774 A1 | 7/2005 | Pierce et al. | |
| 2005/0200062 A1 | 9/2005 | Maurer et al. | |
| 2005/0236867 A1 * | 10/2005 | McNulty | B62D 33/023 296/183.1 |
| 2005/0242620 A1 * | 11/2005 | McNulty | B62D 33/02 296/183.1 |
| 2006/0082191 A1 * | 4/2006 | McNulty | B62D 33/02 296/183.1 |
| 2006/0106147 A1 | 5/2006 | Fasulo et al. | |
| 2006/0199890 A1 | 9/2006 | Fasulo et al. | |
| 2007/0138173 A1 | 6/2007 | Nielsen | |
| 2007/0237612 A1 | 10/2007 | Mammome et al. | |
| 2007/0299185 A1 | 12/2007 | Ottaviani et al. | |
| 2008/0150322 A1 * | 6/2008 | Shelbo | B21D 13/045 296/184.1 |
| 2008/0169674 A1 | 7/2008 | Giles | |
| 2008/0211251 A1 | 9/2008 | Diloreto | |
| 2010/0098925 A1 | 4/2010 | Fasulo et al. | |
| 2010/0327616 A1 | 12/2010 | Calhoun | |
| 2011/0031778 A1 * | 2/2011 | Edwards | B60R 9/00 296/183.1 |
| 2011/0121225 A1 | 5/2011 | Posudievsky et al. | |
| 2011/0260506 A1 | 10/2011 | Brooks et al. | |
| 2013/0069417 A1 | 3/2013 | Wink | |
| 2013/0122262 A1 | 5/2013 | Nagakura et al. | |
| 2013/0272780 A1 | 10/2013 | Takeuchi et al. | |
| 2013/0309001 A1 | 11/2013 | Teshima et al. | |
| 2013/0313860 A1 | 11/2013 | Yamaji et al. | |
| 2013/0313862 A1 | 11/2013 | Yamaji et al. | |
| 2013/0313863 A1 | 11/2013 | Yamaji et al. | |
| 2013/0317161 A1 | 11/2013 | Konagai et al. | |
| 2013/0344282 A1 | 12/2013 | Yagi et al. | |
| 2014/0004308 A1 | 1/2014 | Taniguchi et al. | |
| 2014/0035308 A1 | 2/2014 | Suzuki et al. | |
| 2014/0039114 A1 | 2/2014 | Hagihara et al. | |
| 2015/0108793 A1 | 4/2015 | Peschansky et al. | |
| 2015/0109087 A1 | 4/2015 | Golner et al. | |
| 2016/0001721 A1 | 1/2016 | Owens et al. | |
| 2016/0001816 A1 | 1/2016 | Aitharaju et al. | |

FOREIGN PATENT DOCUMENTS

| | | |
|---|---|---|
| DE | 102015110137 A1 | 1/2016 |
| DE | 102015110302 A1 | 1/2016 |
| JP | S58175928U U | 11/1983 |
| JP | S59167119 U | 11/1984 |
| JP | S6131975U U | 2/1986 |
| JP | 2007528970 | 10/2007 |
| JP | 2016013830 | 1/2016 |
| JP | 2016013832 | 1/2016 |
| WO | 2005116478 | 12/2005 |
| WO | 2012/102315 A1 | 8/2012 |
| WO | 2012/105080 A1 | 8/2012 |
| WO | 2012/105387 A1 | 8/2012 |
| WO | 2012/105389 A1 | 8/2012 |
| WO | 2012/105716 A1 | 8/2012 |
| WO | 2012/105717 A1 | 8/2012 |
| WO | 2012/108446 A1 | 9/2012 |
| WO | 2012/117593 A1 | 10/2012 |
| WO | 2012/140793 A1 | 10/2012 |

OTHER PUBLICATIONS

A First Office Action in Japanese Application No. 2015-130724 from the Japanese Patent Office mailed Jun. 15, 2016, and English translation of Notification of Reason(s) for Refusal (Office Action) by Yuasa and Hara; 11 pages.

A First Office Action in Japanese Application No. 2015-132442 from the Japanese Patent Office mailed May 6, 2016, English translation of Notification of Reason(s) for Refusal (Office Action) by Yuasa and Hara; 9 pages.

\* cited by examiner

CORRUGATION DESIGNS

FIELD

The present disclosure relates to a vehicle or automotive component, such as impact resistant load-bearing structures or impact resistant non-load bearing structures, and more particularly to improved corrugation designs for such impact resistant structures.

BACKGROUND

This section provides background information related to the present disclosure which is not necessarily prior art.

Non-load carrying or load-carrying structures for vehicles or automotive applications facilitate transportation of passengers and cargo from one location to another. Such components are typically made of metals, such as steel or aluminum. Metals provide robust components, including good ductility, strength and impact resistance. Impact resistance and strength are particularly important, as automotive load-carrying structures are often used for construction or industrial use. Such structures typically need to support the weight of other components, equipment, or items within the vehicle, such as cargo, storage items, and passengers carried within the vehicle, and further should exhibit an ability to withstand impact from dropping of heavy and/or sharp objects (e.g., as cargo may be loaded from various heights). While metals have performed well as load-carrying structures for automotive applications, they have a distinct disadvantage in being heavy and reducing gravimetric efficiency and thus fuel economy of a vehicle.

Light-weight reinforced composite materials have been considered as alternative load-carrying surfaces for vehicle applications. However, conventional composite materials have not exhibited the necessary robustness for long-term use in vehicles or other load-carrying applications, as they tend to have limited ductility (increased brittleness) and exhibit reduced impact resistance. Thus, improvements in designs of structures formed of composite materials, so as to provide necessary impact resistance and toughness for commercial and industrial applications, would be highly desirable to improve long-term durability of such structures for both load-bearing or non-load bearing applications, while reducing weight and improving fuel economy.

SUMMARY

This section provides a general summary of the disclosure and is not a comprehensive disclosure of its full scope or all of its features.

The present disclosure provides improved impact resistant components for both load-carrying and non-load carrying applications. In certain aspects, the components are particularly suitable for use in a vehicle or automobile. The impact resistant component is optionally formed of a composite material. In certain aspects, the present disclosure contemplates an impact resistant component (e.g., for an automobile or vehicle) that comprises a support structure comprising a plurality of elongate ridges formed therein. Each respective elongate ridge comprises a top wall and a pair of side walls. At least one thickened region is provided for structural support on at least one of the top wall or the side walls. Each respective elongate ridge of the plurality is spaced apart from adjacent elongate ridges of the plurality at predetermined intervals to form a corrugated surface capable of load-carrying. Such a support structure is impact resistant and thus resistant to cracking or other mechanical damage.

In other aspects, the present disclosure contemplates an impact resistant component (e.g., for an automobile or vehicle) that comprises a support structure. The impact resistant component comprises a support structure comprising a plurality of elongate ridges formed therein. Each respective elongate ridge comprises a top wall and a pair of side walls. The top wall is arced and thus defines a radius of curvature. The support structure comprises a composite material. Further, each respective elongate ridge of the plurality is spaced apart from adjacent elongate ridges of the plurality at predetermined intervals to form a corrugated surface capable of load-carrying. Such a support structure is impact resistant and thus resistant to cracking or other mechanical damage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "bottom," "lower," "above," "top," "upper," "interior," "exterior," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, numerical values represent approximate measures or limits to ranges to encompass minor deviations from the given values and embodiments having about the value mentioned as well as those having exactly the value mentioned. Other than in the working examples provided, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

Example embodiments will now be described more fully with reference to the accompanying drawings.

In various aspects, the present disclosure provides improved impact resistant components, which may be non-load bearing or non-load carrying or alternatively load-bearing or load-carrying, which are thus suitable for carrying loads. Such impact resistant components may be particularly suitable for use in a vehicle or automobile. While not limiting, the inventive technology is particularly suitable for use with components comprising a polymeric composite material. Referring generally to FIGS. 1-9, improved corrugation designs for such impact resistant components are illustrated. While an exemplary component is illustrated and described throughout the specification, it is understood that the inventive concepts in the present disclosure may also be applied to any impact resistant structural component, including those used in vehicles, like automotive applications including, but not limited to, gas tank protection shields, underbody shields, structural panels, interior floors, floor pans (e.g., of a cargo van), roofs, exterior surfaces, storage areas, including glove boxes, console boxes, trunks, trunk floors, truck beds, and the like. Specifically, the present disclosure is particularly suitable for any piece of hardware subject to loading or impact (e.g., load bearing). In alternative variations, the present disclosure is likewise applicable to any piece of hardware subject to impact that is non-load bearing.

Figure 1:
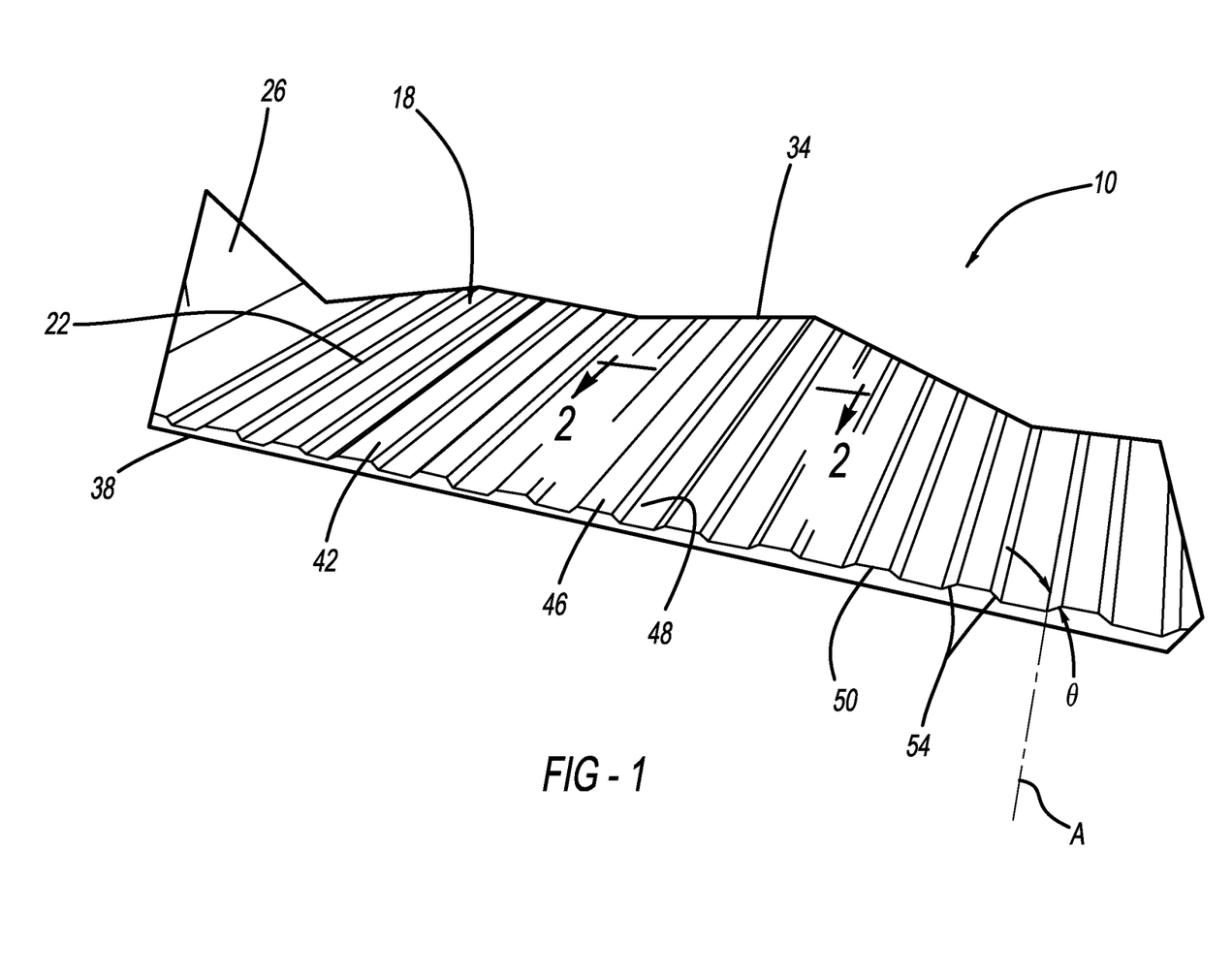
FIG. 1 is a perspective view of a load-carrying structure for a vehicle having corrugations according to the present disclosure.

Load-carrying structures can be used to transport some form of cargo for both passenger and cargo trucks, by way of non-limiting example. An exemplary schematic illustration of a section of a vehicle 10 having an impact resistant structural component 18 is shown in FIG. 1. The structural component 18 comprises a support structure or floor 22, which can support a load, such as cargo, and a side wall 26. While the illustrated configuration includes a floor 22 and a single side wall 26, it is noted that multiple components may be used or alternatively may not be present on all structural components, nor are these structures required for implementation of the present disclosure.

The structural component 18 may be made of material that is robust, such as steel, aluminum, composite, or any other material. In certain aspects, the structural component is a material that is capable of supporting loads. While not limiting, the concepts discussed in the present disclosure are particularly suitable for use with structural component 18 formed of a polymeric composite material. For example only, the structural component 18 may be a fiber-reinforced composite comprising a polymer matrix and a plurality of reinforcing fibers distributed therein.

In forming vehicle components (e.g., automotive application components like structural component 18), enhancing structural stiffness, strength and impact resistance, while reducing overall weight is important to improve performance and efficiency. Stiffness is determined by a combination of material modulus (a material property) and geometry of the component or part. When, designing certain vehicle components, such as a structural component floor, stiffness and impact resistance must be balanced. For example, if a structural component is too stiff, the structural component cannot bend sufficiently to absorb energy elastically and all of the impact energy is available to initiate a crack. A structural component with less stiffness can bend to store some energy elastically and thus reduce the energy leftover to minimize cracking. However, stiffness cannot be too low, because a structural component must still have a discernible rigidity for most applications.

While metallic materials, such as steel or aluminum, have relatively high ultimate strain (e.g., about 20% to about 40%) with relatively high strength, stiffness may require improvement. To improve stiffness in metal materials, corrugation height can be increased. Increasing corrugation height increases the overall weight of the component and metals are relatively heavy materials. However, weight reduction is important in vehicles.

A vehicle component formed of a polymeric composite material is lighter in weight, as compared to metal components, and thus provides better fuel economy for a vehicle. A representative weight reduction of a vehicle component formed of a composite material in certain variations of the present teachings is greater than or equal to about 40%, optionally greater than or equal to about 50%, and optionally greater than or equal to about 60% by weight as compared to a metal structure having the same design. The polymer may be formed from or comprise a thermoplastic resin. The fiber-reinforced composite may further include a viscoelastic characteristic. In certain aspects, a suitable fiber-reinforced composite may further include a plurality of carbon fibers.

In certain aspects, the fiber-reinforced composite may be any of the fiber-reinforced composite materials disclosed in U.S. Patent Publication Nos. 2013/0122262 and 2013/0272780, PCT International Publication Nos. WO 2012/117593, WO 2012/105716, WO 2012/102315, WO 2012/105387, WO 2012/105389, WO 2012/105717, WO 2012/108446 and WO 2012/140793, each of which is respectively incorporated herein by reference in its entirety. Particularly suitable fiber-reinforced composite for use as structural components in accordance with the present disclosure are described in PCT International Publication No. WO 2012/105080 and U.S. Patent Publication No. 2015/0108793 filed as U.S. Application Ser. No. 14/058,656 on Oct. 21, 2013 entitled "Carbon Fiber Cross Member for Automotive Chassis Structure," each of which is respectively incorporated herein by reference in its entirety.

Thus, suitable fiber-reinforced composite materials may comprise a thermoplastic resin reinforced with a carbon fiber material. The carbon fibers may be provided as fiber mats having interconnecting or contacting fibers or may be randomly distributed individual fibers within the resin matrix. Suitable carbon fibers may include relatively short length fibers (having lengths of ≥about 0.1 mm to ≤about 10 mm), relatively long length fibers (having lengths of ≥about 10 mm to ≤about 100 mm), or continuous fibers (having lengths of about 100 mm), and may include any combinations thereof. Long length fibers can provide good balance of moldability/productivity/mechanical performance. The carbon fibers may be chopped, as well.

The carbon fibers within the composite may be configured in a random-oriented manner, for example, in a substantially two-dimensionally-random oriented or in a specific-direction-oriented manner. In certain variations, a fiber mat comprising carbon fibers may be used with highly planar oriented or uni-directional oriented fibers or a combination thereof. The fiber mat may have a random-oriented fiber for good balance of moldability/productivity/mechanical performance. In certain variations, a random carbon fiber mat can be used as a preform of a fiber-reinforced composite material that is shaped. The random mat may include reinforcing carbon fibers having an average fiber length of greater than or equal to about 3 mm to less than or equal to about 100 mm and a thermoplastic resin. Such a random carbon fiber mat is further described in WO 2012/105080 discussed above. In addition, a uni-directional oriented carbon fiber layer may be included in order to enhance local stiffness and strength for the load-carrying support structure.

In certain variations, the fiber-reinforced composite may comprise a carbon fiber material that is surface-modified or grafted with a polymer, such as a copolymerized polyolefin attached to a surface of the carbon fibers. The copolymerized polyolefin may contain an aromatic vinyl compound and an acid and/or acid anhydride as copolymerization components, by way of non-limiting example.

The thermoplastic resin may include any suitable kind of thermoplastic resin. By way of non-limiting example, the thermoplastic resin may include: vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), polyacetal resin, polycarbonate resin, polyethylene terephthalate resin, polyethylene naphthalate resin, polybutylene terephthalate resin, polyarylate resin, polyphenylene ether resin, polyphenylene sulfide resin, polysulfone resin, polyether sulfone resin, polyether ether ketone resin, polylactide resin, or any combination or copolymer of these resins. As appreciated by those of skill in the art, the carbon fiber reinforced composite material may further include other conventional ingredients, including other reinforcement materials, functional fillers or additive agents, like organic/inorganic fillers, fire-retardants, anti-ultraviolet radiation agents (UV stabilizers), anti-oxidants, colorants, mold release agents, softeners, plasticizing agents, surface active agents, and the like.

The carbon fiber reinforced composite material may include a fiber-reinforced layer and a resin layer laminated together. Such fiber-reinforced composite materials may be manufactured from a compression molding process. While thermoplastic resins (e.g., PA6, PC, PP, and the like) have higher elongation values, such materials by themselves do not exhibit sufficient strength. Thus composite materials comprising resins and reinforcing species, such as glass fiber reinforced polymeric composites (GFRP) or carbon fiber reinforced polymeric composites (CFRP) exhibit high strength and reasonable stiffness, while also being light weight (as compared to metals). However, fiber reinforced composites may have relatively low levels of elongation, especially in the case of CFRP (e.g., which may be only about 1% to about 2%). Thus, in certain aspects, if a flat fiber reinforced composite material is used, stiffness will be too low for various applications. Lower stiffness creates large strain under concentrated impact loads, meaning the balance of stiffness and impact resistance could be improved. If a corrugated surface profile design is used, higher stiffness occurs, but then small or low elongation creates local crack or failure under concentrated impact load (hence impact resistance is insufficient). Thus, in accordance with various aspects of the present disclosure, optimized designs are used to form a structural composite material component, such as carbon fiber reinforced composite materials, in a vehicle that exhibits required stiffness, strength and impact resistance.

Strain-to-fail is a material property where a higher value is desirable for vehicle components. In certain aspects, a representative carbon fiber reinforced composite material may have a strain-to-fail value of greater than or equal to about 1%, optionally greater than or equal to about 1.5%, and in certain variations, optionally greater than or equal to about 2%.

In certain aspects, suitable fiber-reinforced composite materials comprise thermoplastic resin reinforced with carbon fiber, for example, a carbon fiber mat, that has a tensile strength (σ) of greater than or equal to about 200 MPa and a flexural strength (e.g., bending or fracture strength) of greater than or equal to about 300 MPa. A Young's modulus (E) is a mechanical property of a material referring to a ratio of stress to strain ($\sigma/\epsilon$), reflecting the material's elasticity. In certain variations, a material used for the impact resistant component, such as a carbon fiber-reinforced composite, has a Young's modulus (E) of greater than or equal to about 20 GPa to less than or equal to about 30 GPa.

With renewed reference to FIG. 1, the structural component 18 may include corrugated surface regions 42 on the floor 22. While it is not illustrated in FIG. 1, the structural component 18 may also include corrugated surface regions 42 extending on the side wall 26 (and thus bridging the corner and extending from floor 22 up side wall 26). The corrugated surface regions 42 include a plurality of elongate ridge structures or corrugations 46 formed in the material of the structural component 18. The corrugated surface regions 42 include a plurality of corrugations 46 formed in the material of the structural component 18 or as a layer disposed on the floor 22. Corrugated surface regions 42 advantageously increase the strength and rigidity of the supporting surface on which any cargo or load is received. Furthermore, corrugated surface regions 42 raise the cargo or stored items off the floor 22 and thus elevate the cargo above any water or other debris present in or near the structural component 18. It should be further noted that the structural component 18 and floor 22 having the corrugated surface regions 42 need not be limited to being entirely planar as shown, but may have undulations, bending, corners, or an otherwise shaped profile. In certain aspects, the corrugated surface regions 42 having such bends, corners, or other shapes can remain close to having a straight-line design.

The plurality of corrugations 46 may be elongated ridges, or raised portions, of the structural component 18. Thus, each respective elongate ridge structure or corrugation 46 defines a major longitudinal axis and extends longitudinally from a first side 34 to a second side 38. Further, each respective elongate ridge or corrugation 46 of the plurality is spaced apart from adjacent elongate ridges of the plurality at predetermined intervals to form the corrugated surface regions 42. Thus, a plurality of regions 48 (e.g., valley or troughs) are defined between the respective elongate ridge corrugations 46. It should be noted that a corrugation 46 need not extend from first side 34 to second side 38 and also is not limited to the exemplary configuration and orientation shown.

The raised corrugations 46 may be of a generally periodic pattern, meaning that they repeat at regular predetermined intervals. In accordance with various aspects of the present disclosure, specific details and features of the corrugation design and pattern can serve to significantly enhance functionality of the structural component 18 and improve performance of the structural component 18 under impact and loading tests. Such embodiments, as described herein, are particularly suitable for improving strength and impact resistance of composite materials.

Figure 9:
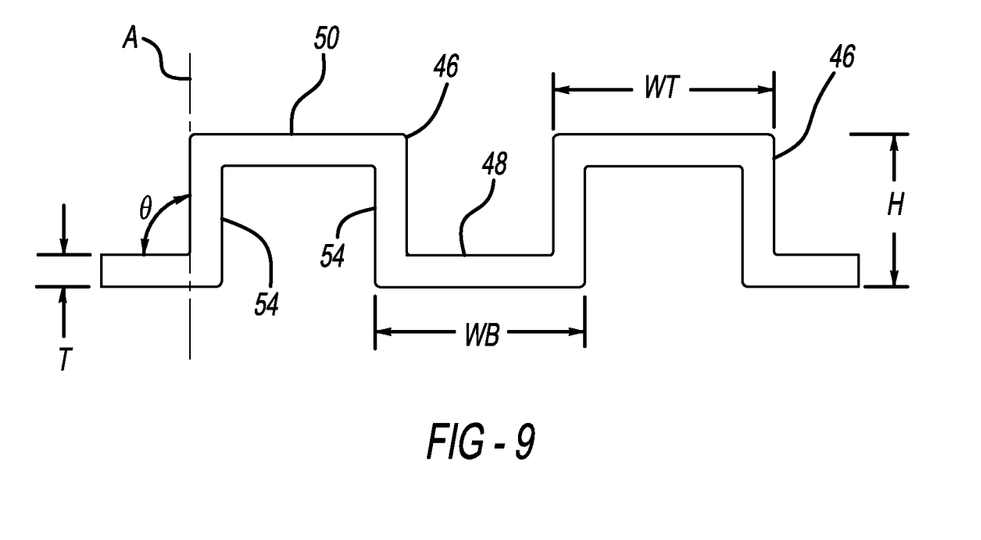
FIG. 9 is a sectional view of a schematic of an exemplary elongated ridge corrugation profile showing relationships between heights, widths, thicknesses, and angles of offset.

As best shown in FIG. 9, each elongated ridge or corrugation 46 has a top wall 50 and a pair of two side walls 54. In some example embodiments, the side walls 54 may be oriented at an angle θ with respect to a perpendicular line A in relation to the top wall 50. In other examples, the side walls 54 may be perpendicular with respect to the top wall 50.

In industry, vehicle manufacturers and/or suppliers may perform impact and load testing on structural components 18 to determine performance characteristics. A variety of impact and performance tests are well known in the art and may also be employed to determine suitability of impact resistance and/or structural component performance.

For automotive applications, a small object, stone, or corner of a brick or block are typical examples that cause concentrated impact load on a vehicle component, especially on load-carrying structural components, and which may cause failure or damage to due impact. Usually such objects have a relatively small radius (e.g., radius of less than or equal to about 10 mm). The surface must thus be designed to withstand contact and impact from an object having such a relatively small radius.

Figure 2:
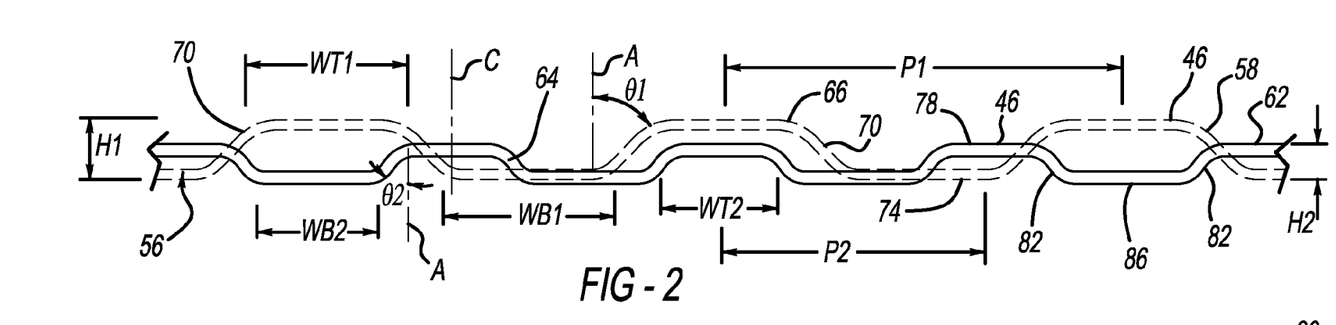
FIG. 2 is a sectional view of the corrugations taken at 2-2 from FIG. 1.

To further illustrate certain aspects of the present disclosure, FIG. 2 compares a first corrugation surface 56 that is a conventional design and a second corrugation surface 62 that is an exemplary design according to certain aspects of the present disclosure. The first corrugation surface 56 is a corrugation configuration that is conventionally used. The second corrugation surface 62 is an alternative corrugation design in accordance with certain aspects of the present disclosure that improves the impact resistance of the corrugated surface regions 42 of the structural component 18. The first corrugation surface 56 includes a plurality of first conventional elongated channels or corrugations 58 at spaced apart predetermined intervals from one another, separated by lower floor regions or bottom walls 74 disposed therebetween. The first corrugation 58 may include a top wall 66 having a width WT1 and a plurality of side walls 70 having a height H1. Each bottom wall 74 has a width WB1 between respective first corrugations 58. The side walls 70 may define an angle θ1 with respect to the line A extending perpendicularly from the bottom wall 74.

The second corrugation surface 62 includes a plurality of second elongated channels or corrugations 64 spaced apart at predetermined intervals from one another and separated by bottom walls 86. The second corrugation 64 may include a top wall 78 having a width WT2, a plurality of side walls 82 having a height H2. Each bottom wall 86 has a width WB2. The side walls 82 may define an angle θ2 with respect to the line A extending perpendicularly from the lower region bottom wall 86.

The widths WT2 and WB2 and the height H2 of the second corrugation 64 are reduced from the widths WT1 and WB1 and the height H1 of the first corrugation 58 to increase the energy absorbed during impact. Such a corrugation design is particularly well suited for enhancing impact strength of a composite material. As discussed above, in conventional systems, increasing height of the corrugation channels tends to enhance stiffness for composite materials; however, in the designs in accordance with certain aspects of the present disclosure, corrugation height is instead reduced to an optimized intermediate height to improve impact resistance performance of the composite material as a load-carrying structure. Moreover, the corrugated surface designs in accordance with certain aspects of the present teachings reduce the propensity for local cracks or failure under concentrated impact load. Thus, in accordance with various aspects of the present disclosure, composite materials, such as carbon fiber reinforced composite materials, have optimized designs to form a structural component in a vehicle that exhibits required stiffness, strength and impact resistance.

In various aspects, the present disclosure contemplates superior corrugation profiles and designs by optimizing relationships between elongated ridge/corrugation width, corrugation height, material thickness, spacing between elongated ridges/corrugations, wall angles, and the like. A simplified exemplary schematic of a corrugated surface profile is shown in FIG. 9. Each elongated ridge or corrugation 46 is spaced apart at predetermined intervals from adjacent ridges or corrugation 46 by lower regions 48 (or bottom walls). Each corrugation 46 has the top wall 50 and the pair of side walls 54. Thus, WT is a width of top wall 50, WB shows a width of bottom wall or lower region 48, H is a height of each ridge or corrugation 46, while T is thickness of the support structure material.

In certain aspects, a particularly suitable corrugation design may have the following parameters. Width WT of the top wall 50 may be greater than or equal to about 20 mm to less than or equal to about 35 mm, while the width WB of the lower regions 48 at predetermined intervals between elongated ridges or corrugations 46 may be greater than or equal to about 20 mm to less than or equal to about 40 mm. Such a range of widths WT and WB provides a sufficient number of corrugation ridges per unit area (corrugation density) to ensure that larger objects, like cement blocks or other cargo, hit and distribute impact of a sufficient amount of corrugations. Decreasing the WT to a dimension that is too small penalizes the mass efficiency of the support structure by increasing the number of corrugations per unit area present and thus the overall mass of the component. If the width WT is smaller, the number of corrugations increases, meaning unit mass of a corrugation becomes heavier (because vertical walls have a diminished effect in enhancing the stiffness). Therefore, as WT is decreased, a larger ratio of composite material is used in the vertical walls of the structural component. Thus, in certain aspects, the design of the corrugated surface minimizes mass, so that a larger WT dimension is favorable. However, if WT gets to be too large, then the impact resistance is diminished. In certain variations, the dimensions of WT are such that the corrugations can provide adequate support for a representative object (e.g., a cement block) with at least two corrugation ridges over the object's surface.

Regarding the height H of side walls 54, a lower height tends to be better for impact; however, a higher height tends to provide better stiffness of the support structure. Thus, in accordance with certain aspects, a particularly suitable height H for side walls 54 may be greater than or equal to about 10 mm to less than or equal to about 18 mm, optionally greater than or equal to about 10 mm to less than or equal to about 13 mm to balance impact resistance with stiffness. As noted above, in certain variations, the material forming the structural component 18 may comprise a composite material, such as a carbon-fiber reinforced thermoplastic polymer composite material, having a Young's modulus (E) of greater than or equal to about 20 GPa to less than or equal to about 30 GPa. In certain particular variations, a ratio of height (H) the corrugation side wall 54 to Young's modulus (E) (H:E) is greater than or equal to about 0.4 mm/GPa to less than or equal to about 1 mm/GPa, optionally greater than or equal to about 0.4 mm/GPa to less than or equal to about 0.75 mm/GPa, and in certain variations, optionally greater than or equal to about 0.4 mm/GPa to less than or equal to about 0.65 mm/GPa.

The thickness (T) of the support structure material may be greater than or equal to about 1.5 mm to less than or equal to about 5 mm, and optionally greater than or equal to about 2.5 mm to less than or equal to about 4 mm, in certain variations. In accordance with certain aspects of the present teachings, thickness may be increased strategically at various locations on the corrugation to help provide structural support to areas subjected to especially high stress, where mechanical failure may otherwise occur.

The present disclosure also contemplates that the corners formed between top wall 50 and side wall 54 or between side wall 54 and lower region 48 in any of the embodiments may be rectangular, rounded, or beveled and any combinations thereof. For example, the side walls 54 may be oriented at an angle $\theta$ with respect to the lower regions 48 or top wall 50. As shown in FIG. 9, $\theta$ is an angle defined between the bottom wall/lower region 48 and side wall 54 and is shown to be orthogonal or 90°. Stated in another way, angle $\theta$ may be offset from a perpendicular line A in relation to the top wall 50 by greater than or equal to 0° to less than or equal to about 20° and in certain aspects, optionally greater than or equal about 5° to less than or equal to about 10°. While a lower offset angle $\theta$ tends to be more desirable to provide better impact resistance, the ability to form such low offset angles can be limited by manufacturing processes.

With renewed reference to FIG. 2, for example only, the width WT1 of the conventional first corrugation 58 may thus be greater than or equal to about 22 millimeters (mm), the width WB1 may be greater than or equal to about 30 mm, the height H1 may be greater than or equal to about 15 mm, and the angle $\theta 1$ may be within a range of greater than or equal to 0 degrees to less than or equal to about 20 degrees. For example only, the width WT2 of the second corrugation 64 may be within a range of greater than or equal to about 20 mm to less than or equal to about 35 mm, the width WB2 may be within a range of greater than or equal to about 20 mm to less than or equal to about 40 mm, the height H2 may be within a range of greater than or equal to about 10 mm to less than or equal to about 18 mm, optionally greater than or equal to about 10 mm to less than or equal to about 13 mm, and the angle $\theta 2$ may be within a range of greater than or equal to about 5 degrees to less than or equal to about 10 degrees. The widths WT2 and WB2 and the height H2 of the second corrugation surface 62 are the same for the examples described in FIGS. 3-8.

The shapes of the first corrugation surface 56 and the second corrugation surface 62 are periodic and repeat at predetermined intervals, so that each has a period of oscillation P1 and P2 (extending from one corrugation to an adjacent corrugation), respectively. The period P2 of the second corrugation surface 62 is approximately half of the period P1 of the first corrugation surface 56. The reduced height H2, narrower widths WT2 and WB2, and decreased period P2 (e.g., larger number of corrugations per unit area) allows for increased performance under impact. During impact, the energy distributed to the second corrugations 64 of the second corrugated surface regions 62 (e.g., 42 in FIG. 1) or the impact energy, is dissipated or stored elastically, thus reducing the probability of failure during impact. The shape, period P2, and relationships for the second corrugation 64 are the same for the examples described in FIGS. 3-8.

The widths WT2 and WB2, the height H2, and the periodic shape of the second corrugation 62 may be determined using advanced computer modeling such as advanced computer-aided engineering (CAE) simulations and experiments. The advanced CAE programs may assist with optimizing geometrical parameters for the corrugation geometry by balancing the height, widths, and thickness of the support structure in consideration of the material properties. The advanced CAE programs may assist with optimizing the height, width at the top, wall angle, curvature of the impact surface, and an increase in thickness in localized areas to create a desired balance between the stiffness and impact performance of the corrugated surface region 42.

The second corrugation surface 62 thus has improved impact resistance over conventional designs, like first corrugation surface 56. Impact resistance testing is a way of rating the resistance of a component to cracking or breakage when struck by an impact force. Various well known standards specify the requirements for the impact testing, including the type and weight of the striker, also known as the Tup, the impact force, and the specimen support (either a v-block of a flat plate). There are three types of Tup strikers used for testing: Type A is a cone with a rounded point, Type B is a cylinder with a relatively flat surface, and Type C has a 0.5 inch diameter pin with a rounded or hemispherical end. The Tup striker is allowed to fall free and strike the specimen, but is typically connected to a cable that prevents it from bouncing or rebounding and striking the specimen again after the initial strike. The test specimen is then inspected for any signs of cracking or failure. In certain variations, the impact energy test used to determine such impact energy to first crack in accordance with certain aspects of the present disclosure is a Type C conducted with a 0.5 inch hemispherical tup striker, as is well known in the art.

For example, an impact testing machine may be a small drop tower that uses a fixed weight (approximately 7 kg) carriage (the tup is rigidly attached to the carriage). The height of the carriage is controlled immediately before dropping. Impact energy is calculated as IE=mgh where m is mass, h is drop height, and g is acceleration (gravitational constant). Drop testing may begin at a low height. The height is then gradually increased until a crack is observed. A second new sample is then used to test directly with the final height (where the crack occurred) to confirm the value.

Therefore, in certain aspects, the second corrugation surface 62 is impact resistant. In certain variations, the second corrugation surface is capable of withstanding greater than or equal to about 8 Joules of impact energy before cracking under the test conditions described above, optionally greater than or equal to about 9 Joules of impact energy before cracking, optionally greater than or equal to about 10 Joules, optionally greater than or equal to about 11 Joules, optionally greater than or equal to about 12 Joules, optionally greater than or equal to about 13 Joules, optionally greater than or equal to about 14 Joules, and optionally greater than or equal to about 15 Joules of impact energy before cracking, by way of non-limiting example. The impact energy test to determine such impact energy to first crack is conducted with a 0.5 inch hemispherical tup striker and tested with a Dynatup carriage assembly of 7 kg, as is described above.

As discussed further below, the comparative first corrugation surface 56 formed of the same material as the second corrugation surface 62 (e.g., an advanced carbon-fiber reinforced composite) is only capable of withstanding about 4 Joules of impact energy before cracking occurs.

In certain variations, the support structure is formed of a composite material, such as a carbon-fiber reinforced thermoplastic polymer composite material. The composite material has a Young's modulus (E) of greater than or equal to about 20 GPa to less than or equal to about 30 GPa, in certain aspects. In certain particular variations, a ratio of height (e.g., H2) the corrugation side wall 82 to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain variations, optionally greater than or equal to about 0.4 mm/GPa to less than or equal to about 0.65 mm/GPa.

Accordingly, the present disclosure contemplates an impact resistant structural component, which may be used for a vehicle for example, comprising a support structure that may comprise a plurality of elongate ridges formed therein. Each respective elongate ridge comprises a top wall and two side walls. Further, each respective elongate ridge of the plurality is spaced apart from adjacent elongate ridges of the plurality at predetermined intervals to form a corrugated surface capable of load-carrying. The support structure optionally comprises a composite material. In certain variations, the composite material comprises a polymeric resin and a carbon fiber reinforcement material. A ratio of a width of the top wall (e.g., WT2) to a height of the side walls (e.g., H2) is greater than or equal to about 1 to less than or equal to about 3, while the support structure exhibits impact resistance. In certain variations, such a support structure is capable of withstanding greater than or equal to about 8 Joules of impact energy before cracking under the test conditions discussed above. In certain aspects, a ratio of a width of the top wall to a height of the side walls is greater than or equal to about 1.25 to less than or equal to about 2.75 and the support structure is impact resistant.

In certain aspects, a height of the side walls (e.g., H2) for the elongate ridge is less than or equal to about 18 mm, optionally less than or equal to about 17 mm, optionally less than or equal to about 16 mm, optionally less than or equal to about 15 mm, optionally less than or equal to about 14 mm, optionally less than or equal to about 13 mm, optionally less than or equal to about 12 mm, optionally less than or equal to about 11 mm, and in certain variations, optionally less than or equal to about 10 mm. In certain variations, the height of the side walls for the elongate ridge is optionally greater than or equal to about 10 mm to less than or equal to about 18 mm, optionally greater than or equal to about 10 mm to less than or equal to about 13 mm, and demonstrates superior impact resistance (e.g., at least about 8 Joules, discussed above).

As noted above, in certain variations, the material comprises a composite material, such as a carbon-fiber reinforced thermoplastic polymer composite material. The composite material may have a Young's modulus (E) of greater than or equal to about 20 GPa to less than or equal to about 30 GPa, in certain aspects. In certain variations, a ratio of height (e.g., H2) the corrugation side wall 54 to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain variations, optionally greater than or equal to about 0.4 mm/GPa to less than or equal to about 0.65 mm/GPa.

In other aspects, a width of the top wall (e.g., WT2) of the elongate ridge may be less than or equal to about 35 mm, optionally less than or equal to about 34 mm, optionally less than or equal to about 33 mm, optionally less than or equal to about 32 mm, optionally less than or equal to about 31 mm, and in certain aspects, optionally less than or equal to about 30 mm. In certain variations, the width of the top wall is optionally less than or equal to about 29 mm, optionally less than or equal to about 28 mm, optionally less than or equal to about 27 mm, optionally less than or equal to about 26 mm, optionally less than or equal to about 25 mm, optionally less than or equal to about 24 mm, optionally less than or equal to about 23 mm, optionally less than or equal to about 22 mm, optionally less than or equal to about 21 mm, and in certain aspects, less than or equal to about 20 mm. In certain aspects, a width of the top wall may be greater than or equal to about 19 mm to less than or equal to about 40 mm, optionally greater than or equal to about 20 mm to less than or equal to about 35 mm, and in certain variations, greater than or equal to about 20 mm to less than or equal to about 25 mm. In certain aspects, such a component may demonstrate an impact resistance of at least about 8 Joules discussed above. In certain other variations, the width of the top wall is optionally greater than or equal to about 20 mm to less than or equal to about 35 mm and demonstrates impact resistance (e.g., at least about 8 Joules, as discussed above).

Further, in certain variations, the lower regions (e.g., WB2) between respective elongate ridges of the plurality of elongate ridges have a predetermined dimension or width of greater than or equal to about 20 mm to less than or equal to about 40 mm and optionally greater than or equal to about 25 mm to less than or equal to about 30 mm, in certain variations. It should be noted while in the embodiment described here that each respective elongate ridge has the same dimensions and spacing between ridges, that in alternative aspects, each respective elongate ridge or corrugation need not be of the same dimensions as other elongate ridges, but may vary in design, dimensions, or spacing from others elongate ridges or corrugations.

Figure 3:
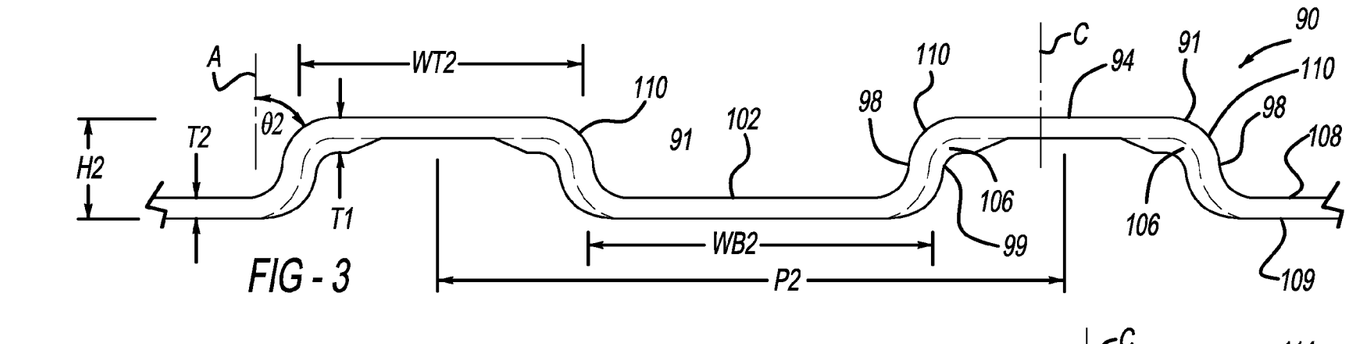
FIG. 3 is a sectional view of another embodiment of corrugations according to the present disclosure.
Figures 5, 6:
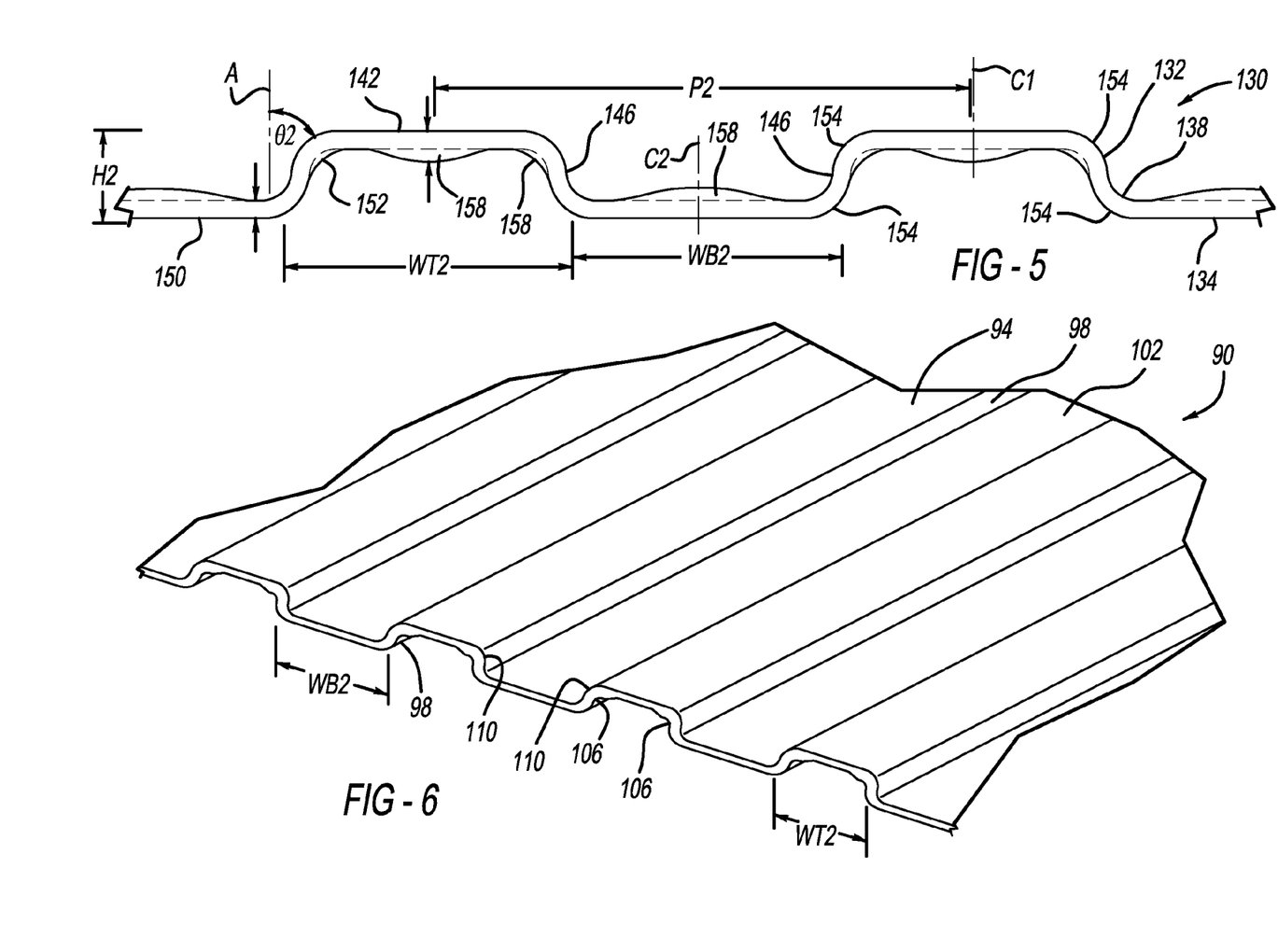
FIG. 5 is a sectional view of still another embodiment of corrugations according to the present disclosure.
FIG. 6 is a perspective view of the corrugations of FIG. 3.

In another example embodiment, referring specifically to FIGS. 3 and 6, a third corrugation surface 90 is illustrated. FIG. 3 illustrates a section view of the third corrugation surface 90, and FIG. 6 illustrates the third corrugation surface 90 implemented of the structural component 18. The third corrugation surface 90 includes a plurality of third elongated channels or third corrugations 91 spaced apart at predetermined intervals from one another and separated by bottom walls 102. The third corrugation surface 90 may be periodic and may have the period P2, the widths WT2 and WB2 and the height H2 of the third corrugation surface 90 are less than the period P1, the widths WT1 and WB1 and the height H1 of the first corrugation surface 56 in FIG. 2.

The third corrugation surface 90 may include a top wall 94 having width WT2, a plurality of side walls 98 having height H2, and a bottom wall 102 having width WB2. The side walls 98 may be at angle θ2 with respect to line A extending perpendicularly from the bottom wall 102.

Third corrugation surface 90 may further include strategically thickened areas or thickened regions 106 for structural support, which improve impact resistance by improving resistance against line loads, by way of non-limiting example. A pair of corners 110 is formed where each side wall 98 meets the top wall 94. Line loads may be loads applied to the side walls 98 and the plurality of corners 110 between the side walls 98 and the top wall 94. Line loads may be experienced during impact testing, as stated previously. Thus, in certain variations, the present disclosure contemplates that at least one thickened region 106 corresponds to the corner 110 where the top wall 94 meets the side wall 98, so as to form an arcuate brace in the corner 110 to improve impact resistance as shown in FIG. 3. Notably, the thickened region 106 serving as an arcuate brace in corner 110 may itself have an indented region 99 with an independent radius of curvature (as shown in FIG. 3) that defines a beveled interior surface or may have other configurations for the thickening regions 106 (not shown), such as a webbed corner region or other bulk reinforcement shape within the corner 110.

In certain exemplary variations, the one or more thickened regions 106 has a first thickness T1 of greater than or equal to about 1.2 mm to less than or equal to about 5 mm, optionally greater than or equal to about 2 mm to less than or equal to about 5 mm, and optionally greater than or equal to about 2.5 mm to less than or equal to about 4 mm, while a second thickness T2 outside of the one or more thickened regions 106 is less than or equal to about 3 mm and optionally less than or equal to about 2 mm, in certain variations. T2 may be greater than or equal to about 1 mm to less than or equal to about 3 mm, optionally greater than or equal to about 1 mm to less than or equal to about 2 mm. The thickness may be measured from a point on the exterior side 108 to a correlating point on the interior side 109. Notably, the thickened regions 106 may have varying thicknesses in that the thickness may be gradually increased from a base thickness to a peak thickness of the thickened region (e.g., increased in a gradient). This design accounts for line impact of block-shaped objects, where the reinforcement in the corner area of the corrugation surface profile tends to support higher percentage of load as compared to a middle area. Thus, the thicker regions in the corner areas reinforce this area serving as an arcuate brace. The thickened regions 106 and remainder of the third corrugation surface 90 are molded, for example, by compression molding of a fiber-reinforced composite material, as one unitary piece.

Figure 4:
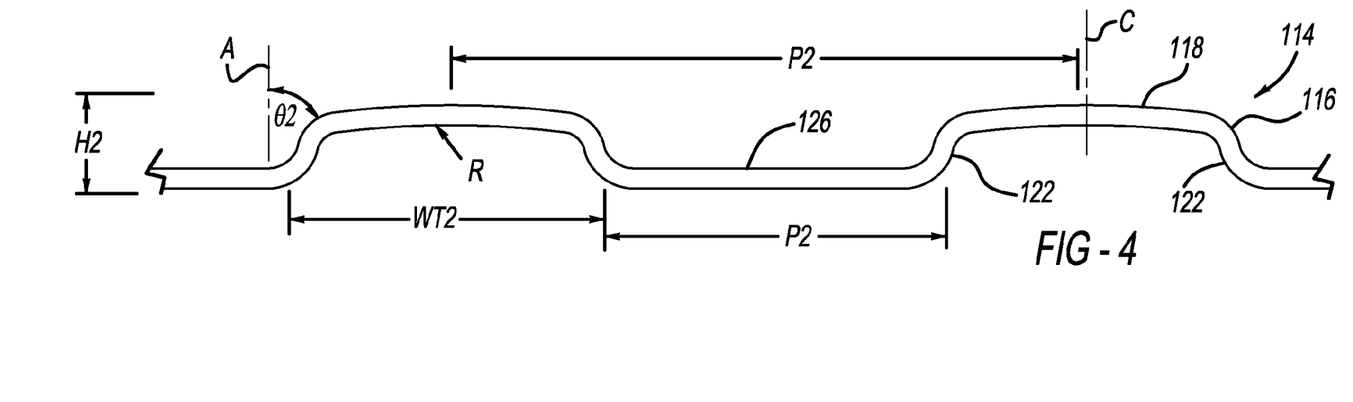
FIG. 4 is a sectional view of still another embodiment of corrugations according to the present disclosure.
Figure 7:
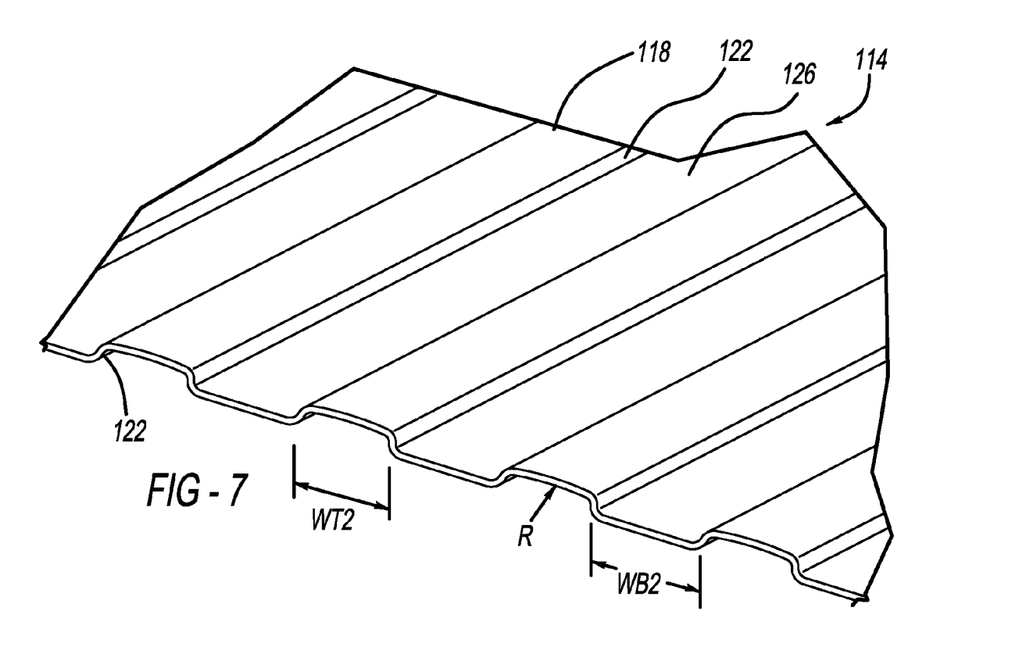
FIG. 7 is a perspective view of the corrugations of FIG. 4.

In another example embodiment, referring specifically to FIGS. 4 and 7, a fourth corrugation surface 114 is illustrated. FIG. 4 illustrates a section view of the fourth corrugation surface 114, and FIG. 7 illustrates the fourth corrugation surface 114 implemented on the floor 22 of the structural component 18. The fourth corrugation surface 114 includes a plurality of fourth elongated channels or fourth corrugations 116 spaced apart at predetermined intervals from one another and separated by lower floor regions or bottom walls 126. The fourth corrugation 116 may include a top wall 118 having width WT2, a plurality of side walls 122 having height H2. The bottom wall 126 has a width WB2. The side walls 122 may be at angle θ2 with respect to line A extending perpendicularly from the bottom wall 126. The fourth elongated corrugations 116 of the fourth corrugation surface 114 may be spaced apart at regular predetermined intervals and thus be periodic with the period P2. Widths WT2 and WB2, and the height H2 of the fourth corrugation surface 114 is less than the period P1, the widths WT1 and WB1, and the height H1 of the first corrugation surface 56 in FIG. 2.

The top wall 118 of each fourth corrugation 116 of the fourth corrugation surface 114 may be arced or curved. Thus, the fourth corrugation 116 may further include a radius of curvature R to deflect objects that potentially impact the top wall 118. Objects may impact the top wall 118 during loading and unloading cargo in a structural component 18. This design accounts for line impact of block-shaped objects, where the curvature on the top surface or wall 118, making the center area the first region to be contacted for line impact, thus storing strain energy before the corner area is contacted by the object. Because the top wall 118 is most likely to contact the cargo first, the top wall 118 includes the radius of curvature R to deflect the impact and distribute the load across more than one point on the top wall 118 of the structural component 18. Impact loads may be experienced during the impact testing stated previously.

Generally, a higher radius of curvature results in better impact resistance performance. With the radius of curvature R being less than or equal to about 5 mm, optionally less than or equal to about 4 mm, optionally less than or equal to about 3 mm, and optionally less than or equal to about 2 mm. Stated in another way, a sagitta of an arc is defined by the arced top wall. The sagitta reflects a height of the arc. The sagittal of the arc may be less than or equal to about 1 millimeter. The arced top wall 118 of the fourth corrugation 116 of the fourth corrugation surface 114 will cause the object to rebound during impact.

Figure 8:
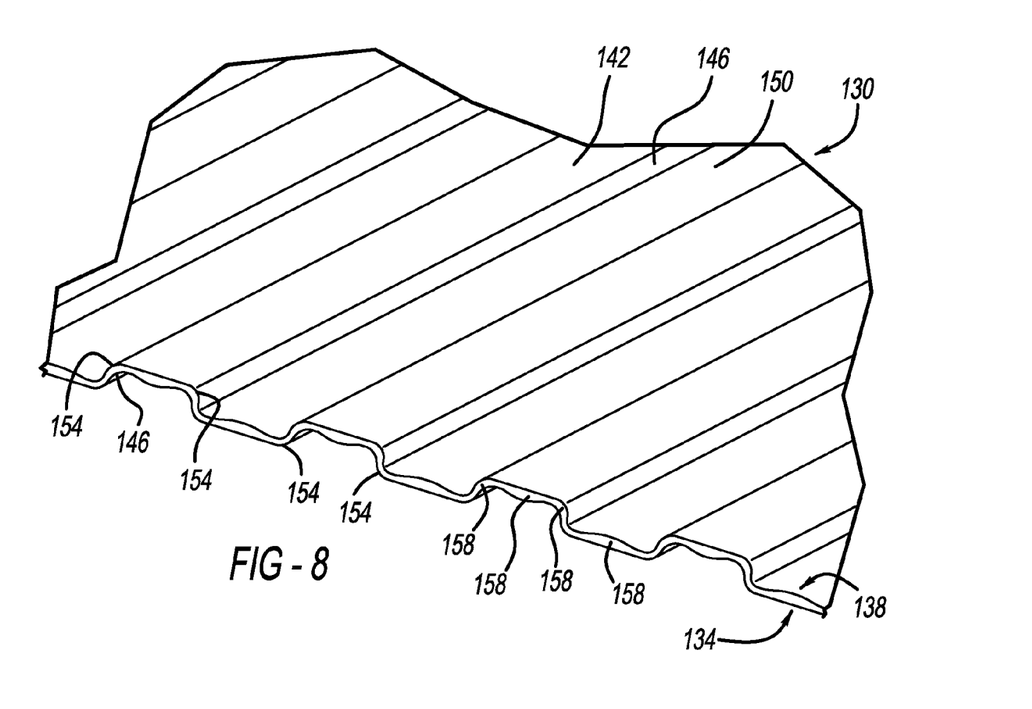
FIG. 8 is a perspective view of the corrugations of FIG. 5.

In another example embodiment, referring specifically to FIGS. 5 and 8, a fifth corrugation surface 130 is illustrated. FIG. 5 illustrates a section view of the fifth corrugation surface 130, and FIG. 8 illustrates the fifth corrugation surface 130 implemented on the floor 22 of the structural component 18. The fifth corrugation surface 130 includes a plurality of fifth elongated channels or fifth corrugations 132 spaced apart at predetermined intervals from one another and separated by lower floor regions or bottom walls 150. The fifth corrugation 132 may include an interior side 134 and an exterior side 138, a top wall 142 having width WT2, a plurality of side walls 146 having height H2. The bottom wall 150 has a width WB2. Corners 154 are formed between each of the side walls 146 and either the top wall 142 or the bottom wall 150 where they respectively meet. The corners 154 may be rounded, as shown in FIG. 5, although in alternative variations, the corners may be rectangular or orthogonal. The side walls 146 may be at angle θ2 with respect to line A extending perpendicularly from the bottom wall 150. The fifth corrugation 132 may be spaced apart at regular predetermined intervals and thus be periodic with the period P2, widths WT2 and WB2, and the height H2 of the fifth corrugation 132 of the fifth corrugation surface 130, which is less than the period P1, the widths WT1 and WB1, and the height H1 of the first corrugation surface 56 in FIG. 2.

Fifth corrugation 132 of the fifth corrugation surface 130 may further include a plurality of strategically thickened areas or thickened regions 158 for structural support on the interior side 134 of the top wall 142 and/or on the exterior side 138 of the bottom wall 150. Thus, the thickened regions 158 may correspond to a portion of the top wall 142 or a portion of the bottom wall 150, where the thickened region 158 has a maximum thickness near a center (C1) of the top wall 142 or near a center (C2) of the bottom wall 150. The corners 154 of the top wall 142 on the interior side 134 may also have thickened regions 158 for providing resistance against pointed loads. Pointed loads may be loads applied to the top and bottom walls 142, 150 and corners 154. Pointed loads may be experienced during the drum drop test and brick drop test stated previously.

The fifth corrugation 132 of the fifth corrugation surface 130 has a thickness T2 (outside of the thickened areas) that may be less than or equal to about 5 mm, optionally less than or equal to about 4 mm, optionally less than or equal to about 3 mm, and optionally less than or equal to about 2 mm, in certain variations. T2 may be greater than or equal to about 1 mm to less than or equal to about 3 mm, optionally greater than or equal to about 1 mm to less than or equal to about 2 mm in certain embodiments. The thickened regions 158 may have a thickness T1 that expands the fifth corrugation 132 to greater than or equal to about 1.2 mm, optionally greater than or equal to about 2 mm, optionally greater than or equal to about 3 mm, optionally greater than or equal to about 4 mm. In certain variations, thickness T1 is greater than or equal to about 1.2 mm to less than or equal to about 5 mm, optionally greater than or equal to about 2 mm to less than or equal to about 5 mm, and in certain variations, optionally greater than or equal to about 2.5 mm to less than or equal to about 4 mm. In certain exemplary variations, the at least one thickened region 158 has a first thickness T1 of greater than or equal to about 2 mm to less than or equal to about 5 mm, while a second thickness T2 outside of the at least one thickened region 158 is less than or equal to about 2 mm.

The thickness ramps from the areas outside of the thickened regions to a maximum peak of the thickened region 158 for structural support. The thickness may be measured from a point on the exterior side 138 to a correlating point on the interior side 134. The middle area of the top wall 142 tends to be weaker than the corner and middle areas of the fifth corrugation 132, because higher stress results from a higher bending moment created in this area by impact. So, the design of the fifth corrugation surface 130 has a greater thickness T1 in the at least one thickened region 158 in the middle area of the top wall 142. In addition, this design has a good balance between performance and moldability. In order to get better moldability, a volume of the upper corrugation area (interior side 134) and lower corrugation area (exterior side 138) is almost same (within about 10%). In order to get higher performance with lower weight, the ratio between maximum and minimum thickness may be greater than or equal to about 1.6 (4/2.5) in certain variations.

Notably, the thickened regions 158 may have varying thicknesses, in that the thickness may be gradually increased from a base thickness to a peak thickness of the thickened region (e.g., C1 or C2) and thus increased in a gradient of thickness. The thickened areas 158 and remainder of the fifth corrugation surface 130 are molded, for example, by compression molding of a fiber-reinforced composite material, as one unitary piece.

The present disclosure thus provides improved impact resistant components for load-carrying applications. In certain aspects, the components are particularly suitable for use in a vehicle or automobile. The impact resistant component is optionally formed of a composite material. In certain aspects, the present disclosure contemplates an impact resistant component (e.g., for an automobile or vehicle) that comprises a support structure comprising a plurality of elongate ridges formed therein. Each respective elongate ridge comprises a top wall and a pair of side walls. At least one thickened region is provided for structural support on at least one of the top wall or the side walls. Each respective elongate ridge of the plurality is spaced apart from adjacent elongate ridges of the plurality at predetermined intervals to form a corrugated surface capable of load-carrying. Such a support structure is impact resistant.

The support structure may further include floor regions (e.g., bottom walls) between respective elongate ridges of the plurality. The at least one thickened region may correspond to a portion of the top wall and/or a portion of the floor regions between respective elongate ridges. In certain aspects, a plurality of strategically thickened areas may be included on at least one of the top wall and side walls. The thickened regions may have a maximum thickness near a center of the top wall and/or near a center of the floor region. The thickened regions may include in certain variations, a thickened portion of the top wall, a thickened portion of the regions between respective elongate ridges (e.g., floor regions), and a thickened plurality of corners where the top wall meets each of the pair of side walls.

In other aspects, the support structure comprises a first interior side and a second exterior side, where the at least one thickened region is disposed on the interior side of the top wall as well as the plurality of corners, but that the thickened regions disposed between elongate ridges in the floor regions are on the second exterior side. A width of the top wall may be greater than or equal to about 20 mm to less than or equal to about 35 mm, a height of the pair of side walls may be greater than or equal to about 10 mm to less than or equal to about 18 mm, optionally greater than or equal to about 10 mm to less than or equal to about 13 mm, and a width of the floor regions between respective elongate ridges of the plurality may be greater than or equal to about 20 mm to less than or equal to about 40 mm.

In certain variations, the at least one thickened region may optionally have a thickness of to greater than or equal to about 1.2 mm, optionally greater than or equal to about 2 mm, optionally greater than or equal to about 3 mm, optionally greater than or equal to about 4 mm. In certain other embodiments, the at least one thickened region may optionally have a thickness of greater than or equal to about 1.2 mm to less than or equal to about 5 mm, optionally greater than or equal to about 2 mm to less than or equal to about 5 mm, and optionally greater than or equal to about 2.5 mm to less than or equal to about 4 mm, while a thickness outside of the at least one thickened region is less than or equal to about 2.5 mm, optionally less than or equal to about 2 mm, and in certain aspects, optionally less than or equal to about 1.2 mm. A second thickness outside of the at least one thickened region may be less than or equal to about 3 mm, optionally less than or equal to about 2.5 mm, and in certain variations, optionally less than or equal to about 1.2 mm. The second thickness outside of the at least one thickened region may be greater than or equal to about 1 mm to less than or equal to about 3 mm, optionally greater than or equal to about 1 mm to less than or equal to about 2 mm.

In certain aspects, the composite material is a fiber-reinforced composite comprising a polymer and a carbon fiber. In certain aspects, the support structure may be formed of a composite material, such as a fiber-reinforced composite comprising a polymer and a carbon fiber reinforcement material, such as a carbon fiber mat. The structural component may be a gas tank protection shield, an underbody shield, a structural panel, an interior floor, a floor pan, a roof, an exterior surface, a storage area, a glove box, a console box, a trunk, a trunk floor, a truck bed, and any combinations thereof. In certain aspects, the vehicle may be a truck and the support structure may be a truck bed floor.

In various aspects, the support structure is impact resistant and capable of withstanding greater than or equal to about 8 Joules of impact energy before cracking under the test conditions previously described above, optionally greater than or equal to about 9 Joules, optionally greater than or equal to about 10 Joules, optionally greater than or equal to about 11 Joules, optionally greater than or equal to about 12 Joules, optionally greater than or equal to about 13 Joules, optionally greater than or equal to about 14 Joules, optionally greater than or equal to about 15 Joules, optionally greater than or equal to about 16 Joules, optionally greater than or equal to about 17 Joules, optionally greater than or equal to about 18 Joules, optionally greater than or equal to about 19 Joules, optionally greater than or equal to about 20 Joules, optionally greater than or equal to about 21 Joules, optionally greater than or equal to about 22 Joules, optionally greater than or equal to about 23 Joules, and in certain aspects, optionally greater than or equal to about 24 Joules of impact energy before any cracking occurs.

In other aspects, the present disclosure further contemplates an impact resistant component for a vehicle having a support structure comprising a plurality of elongate ridges formed therein. Each respective elongate ridge of the plurality is spaced apart from adjacent elongate ridges of the plurality at predetermined intervals to form a corrugated surface capable of load-carrying. Each respective elongate ridge comprises a top wall and a pair of side walls. The top wall is arced and defines a radius of curvature. In certain aspects, a sagitta of an arc defined by the arced top wall may be less than or equal to about 1 millimeter. Further, the plurality of elongate ridges has a generally periodic profile. Such a support structure is impact resistant. In certain aspects, the support structure is capable of withstanding greater than or equal to about 8 Joules of impact energy before cracking.

In certain aspects, the radius of curvature is less than or equal to about 5 mm, optionally less than or equal to about 4 mm, optionally less than or equal to about 3 mm, and optionally less than or equal to about 2 mm. In certain aspects, a sagitta of an arc defined by the arced top wall may be less than or equal to about 1 millimeter. The support structure may further comprise a plurality of strategically thickened areas or regions for additional structural support on at least one of the top wall and side walls.

The support structure may further include floor regions (e.g., bottom walls) between respective elongate ridges of the plurality. A width of the top wall may be greater than or equal to about 20 mm to less than or equal to about 35 mm, a height of the pair of side walls may be greater than or equal to about 10 mm to less than or equal to about 18 mm, optionally greater than or equal to about 10 mm to less than or equal to about 13 mm, and a width of the floor regions between respective elongate ridges of the plurality may be greater than or equal to about 20 mm to less than or equal to about 40 mm.

As noted above, the support structure may be formed of a composite material, such as a carbon-fiber reinforced thermoplastic polymer composite material. The composite material may have a Young's modulus (E) of greater than or equal to about 20 GPa to less than or equal to about 30 GPa, in certain aspects. In certain particular variations, a ratio of height of the pair of side walls to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain variations, optionally greater than or equal to about 0.4 mm/GPa to less than or equal to about 0.65 mm/GPa.

As described in the embodiments above, the one or more thickened regions may correspond to a portion of the top wall and/or a portion of the floor regions between respective elongate ridges. Thus, any of the variations or designs having thickened regions previously described is contemplated for use with this embodiment of a structural support, but for brevity will not be repeated herein.

In certain aspects, the composite material is a fiber-reinforced composite comprising a polymer and a carbon fiber. The support structure may be formed of a composite material, such as a fiber-reinforced composite comprising a polymer and a carbon fiber reinforcement material, such as a carbon fiber mat. Such a support structure may be compression molded. The structural component may be a gas tank protection shield, an underbody shield, a structural panel, an interior floor, a floor pan, a roof, an exterior surface, a storage area, a glove box, a console box, a trunk, a trunk floor, a truck bed, and any combinations thereof. In certain aspects, the vehicle may be a truck and the support structure may be a truck bed floor.

In various aspects, the support structure is impact resistant and capable of withstanding greater than or equal to about 8 Joules of impact energy before cracking under the test conditions previously described above, optionally greater than or equal to about 9 Joules, optionally greater than or equal to about 10 Joules, optionally greater than or equal to about 11 Joules, optionally greater than or equal to about 12 Joules, optionally greater than or equal to about 13 Joules, optionally greater than or equal to about 14 Joules, optionally greater than or equal to about 15 Joules, optionally greater than or equal to about 16 Joules, optionally greater than or equal to about 17 Joules, optionally greater than or equal to about 18 Joules, optionally greater than or equal to about 19 Joules, optionally greater than or equal to about 20 Joules, optionally greater than or equal to about 21 Joules, optionally greater than or equal to about 22 Joules, optionally greater than or equal to about 23 Joules, and in certain aspects, optionally greater than or equal to about 24 Joules of impact energy before cracking occurs.

EXAMPLE 1

An impact test is performed on each of the alternative corrugation designs. The impact test involves applying an impact force on a center C (as illustrated in each of the FIGS. 2-5) of an elongated ridge corrugation (e.g., 46) of a carbon-fiber reinforced composite material with a 0.5 inch striker and with the test described previously above. A piece of material having the corrugated surface region 42 is fixed horizontally to a test table. The striker is a 0.5 inch diameter cylindrical rod having a rounded, or hemispherical, end, or tip. A force and/or distance is increased to increase an amount of energy (E=F*d) that is applied in striking the corrugation with the striker. The energy is increased until a crack is formed in the corrugation. The energy that applies the first crack is then recorded for comparison. The table below illustrates the results of the impact test for each of the figures:

| FIG. Number - Corrugation Design | Energy (J) |
|---|---|
| 2 - First Corrugation Surface | 4 |
| 2 - Second Corrugation Surface | 12 |
| 3 - Third Corrugation Surface | 12 |
| 4 - Fourth Corrugation Surface | 10 |
| 5 - Fifth Corrugation Surface | 15 |

As shown in the results, the baseline, or first corrugation surface 56 design shows cracks at 4J of energy. The second corrugation surface 62 yields an improvement of 3 times the energy to crack over the first corrugation 56. The third corrugation surface 90 yields an improvement of 3 times the energy to crack over the first corrugation surface 56. The fourth corrugation surface 114 yields an improvement of 2.5 times the energy to crack over the first corrugation surface 56. The fifth corrugation surface 130 yields an improvement of 3.75 times the energy to crack over the first corrugation surface 56.

While the second through fifth corrugation surfaces all show significant improvement in impact resistance over the conventional design in the first corrugation surface, based on the impact test results, the fifth corrugation surface 130 is a particularly desirable corrugation design having high impact resistance. The corrugation design selected for the corrugated surface regions 42 of the structural component 18 (or any other piece of hardware) may be selected based on test results other than such an impact test, or may be selected based on a plurality of test results, only one of which is the impact test. As appreciated by those of skill in the art, each of the corrugation designs may perform differently as compared to the other corrugation designs for different tests and with different materials.

Accordingly, in various aspects, the present disclosure provides an impact resistant component for a vehicle having a support structure comprising a corrugated surface capable of load-carrying. The corrugated surface comprises a plurality of elongate ridges formed therein. Each respective elongate ridge of the plurality is spaced apart from adjacent elongate ridges of the plurality at predetermined intervals to form a corrugated surface capable of load-carrying.

In certain preferred aspects, the support structure may comprise a composite material, such as a fiber-reinforced composite comprising a polymer and a carbon fiber. The composite material may have a Young's modulus (E) of greater than or equal to about 20 GPa to less than or equal to about 30 GPa, in certain aspects. In certain particular variations, a ratio of height of the corrugation side wall to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain variations, optionally greater than or equal to about 0.4 mm/GPa to less than or equal to about 0.65 mm/GPa.

The support structure is impact resistant and capable of withstanding greater than or equal to about 8 Joules of impact energy before cracking under the test conditions previously described above, optionally greater than or equal to about 9 Joules, optionally greater than or equal to about 10 Joules, optionally greater than or equal to about 11 Joules, optionally greater than or equal to about 12 Joules, optionally greater than or equal to about 13 Joules, optionally greater than or equal to about 14 Joules, optionally greater than or equal to about 15 Joules, optionally greater than or equal to about 16 Joules, optionally greater than or equal to about 17 Joules, optionally greater than or equal to about 18 Joules, optionally greater than or equal to about 19 Joules, optionally greater than or equal to about 20 Joules, optionally greater than or equal to about 21 Joules, optionally greater than or equal to about 22 Joules, optionally greater than or equal to about 23 Joules, and in certain aspects, optionally greater than or equal to about 24 Joules of impact energy before any cracking occurs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An impact resistant component for a vehicle, comprising:

a support structure comprising a plurality of elongate ridges formed therein, wherein each respective elongate ridge comprises a top wall and a pair of side walls, wherein the support structure comprises a composite material, and wherein a ratio of the height of the side walls to the Young's modulus (E) is greater than or equal to about 0.4 mm/GPa to less than or equal to about 1 mm/GPa; and at least one thickened region for structural support on at least one of the top wall or the side walls, wherein the at least one thickened region corresponds to a corner where the top wall meets a side wall of the pair, so as to form an arcuate brace in the corner and each respective elongate ridge of the plurality is spaced apart from adjacent elongate ridges of the plurality at predetermined intervals to form a corrugated surface capable of load-carrying.

2. The impact resistant component of claim 1, wherein the plurality of elongate ridges has a generally periodic profile.

3. The impact resistant component of claim 1, further comprising floor regions between respective elongate ridges of the plurality, wherein the at least one thickened region further corresponds to a portion of the top wall or a portion of the floor regions between the respective elongate ridges, and the at least one thickened region has a maximum thickness near a center of the top wall or near a center of the respective floor region.

4. The impact resistant component of claim 1, wherein the composite material is a fiber-reinforced composite comprising a polymer and a carbon fiber.

5. The impact resistant component of claim 1, wherein the at least one thickened region has a thickness of greater than or equal to about 3 millimeters to less than or equal to about 5 millimeters, while a thickness outside of the at least one thickened region is greater than or equal to about 2 millimeters to less than or equal to about 3 millimeters.

6. The impact resistant component of claim 1, further comprising floor regions between respective elongate ridges of the plurality, wherein a width of the top wall is greater than or equal to about 20 millimeters to less than or equal to about 35 millimeters, a height of the pair of side walls is greater than or equal to about 10 millimeters to less than or equal to about 18 millimeters, and a width of the floor regions between the respective elongate ridges of the plurality is greater than or equal to about 20 millimeters to less than or equal to about 40 millimeters.

7. The impact resistant component of claim 1, wherein the support structure is selected from the group consisting of: a gas tank protection shield, an underbody shield, a structural panel, an interior floor, a floor pan, a roof, an exterior surface, a storage area, a glove box, a console box, a trunk, a trunk floor, a truck bed, and combinations thereof.

8. An impact resistant component for a vehicle, comprising:

a support structure comprising a plurality of elongate ridges formed therein, wherein each respective elongate ridge comprises a top wall and a pair of side walls and the top wall is arced, wherein the support structure comprises a composite material having a Young's modulus (E) of greater than or equal to about 20 GPa to less than or equal to about 30 GPa and each respective elongate ridge of the plurality is spaced apart from adjacent elongate ridges of the plurality at predetermined intervals to form a corrugated surface capable of load-carrying.

9. The impact resistant component of claim 8, wherein the plurality of elongate ridges has a generally periodic profile.

10. The impact resistant component of claim 8, wherein a sagitta of an arc defined by the arced top wall is less than or equal to about 1 millimeter.

11. The impact resistant component of claim 8, further comprising a plurality of strategically thickened areas on at least one of the top wall and side walls.

12. The impact resistant component of claim 8, wherein the composite material is a fiber-reinforced composite comprising a polymer and a carbon fiber.

13. The impact resistant component of claim 8, wherein the support structure is selected from the group consisting of: a gas tank protection shield, an underbody shield, a structural panel, an interior floor, a floor pan, a roof, an exterior surface, a storage area, a glove box, a console box, a trunk, a trunk floor, a truck bed, and combinations thereof.

14. The impact resistant component of claim 8, wherein a ratio of the height of the side walls to the Young's modulus (E) is greater than or equal to about 0.4 mm/GPa to less than or equal to about 1 mm/GPa.

15. An impact resistant component for a vehicle, comprising:

a support structure comprising a plurality of elongate ridges formed therein, wherein each respective elongate ridge comprises a top wall and a pair of side walls, wherein a ratio of the height of the side walls to the Young's modulus (E) is greater than or equal to about 0.4 mm/GPa to less than or equal to about 1 mm/GPa and the support structure comprises a composite material; and at least one thickened region for structural support on at least one of the top wall or the side walls, wherein each respective elongate ridge of the plurality is spaced apart from adjacent elongate ridges of the plurality at predetermined intervals to form a corrugated surface capable of load-carrying.

16. An impact resistant component for a vehicle, comprising:

a support structure comprising a plurality of elongate ridges formed therein, wherein each respective elongate ridge comprises a top wall and a pair of side walls and the top wall is arced, wherein a ratio of the height of the side walls to the Young's modulus (E) is greater than or equal to about 0.4 mm/GPa to less than or equal to about 1 mm/GPa, the support structure comprises a composite material and each respective elongate ridge of the plurality is spaced apart from adjacent elongate ridges of the plurality at predetermined intervals to form a corrugated surface capable of load-carrying.

* * * * *